United States Patent
Alig

(12) 
(10) Patent No.: US 6,582,675 B2
(45) Date of Patent: Jun. 24, 2003

(54) METHOD FOR THE PREPARATION OF ANHYDROUS SODIUM SULFIDE

(75) Inventor: Alfred Alig, Geiselbach-Omersbach (DE)

(73) Assignee: Degussa AG, Düsseldorf (DE)

( * ) Notice: Subject to any disclaimer, the term of this patent is extended or adjusted under 35 U.S.C. 154(b) by 78 days.

(21) Appl. No.: 09/813,934

(22) Filed: Mar. 22, 2001

(65) Prior Publication Data

US 2001/0033824 A1 Oct. 25, 2001

Related U.S. Application Data

(60) Provisional application No. 60/192,576, filed on Mar. 28, 2000.

(51) Int. Cl.$^7$ .......................... C01B 17/22; C01B 17/38
(52) U.S. Cl. .................................... 423/566.2
(58) Field of Search ....................... 423/566.2

(56) References Cited

U.S. PATENT DOCUMENTS 4,784,805 A * 11/1988 Blattner ...................... 260/352

FOREIGN PATENT DOCUMENTS

| EP | 0 345 136 B1 | * | 3/1994 | ............ C01B/17/38 |
| EP | 0 924 165 A1 | * | 6/1999 | ............ C01B/17/38 |
| JP | 4-310508 A | * | 11/1992 | ............ C01B/17/38 |

OTHER PUBLICATIONS

1 Page Description of "Discotherm B Processor" Bearing a DocId=54E56C82–ED Sep. 23, 2002 and a Copyright Date of 1996–2002 Obtained from http://www.chemicalonline.com and 1 Page Titled "Available Equipment for Test or rental" Obtained From http://www.listgrp.com.*

* cited by examiner

Primary Examiner—Stanley S. Silverman
Assistant Examiner—Timothy C Vanoy
(74) Attorney, Agent, or Firm—Smith, Gambrell & Russell, LLP

(57) ABSTRACT

A method of preparing anhydrous sodium sulfide having an $Na_2S$ content of at least 98 wt %, by drying hydrous sodium sulfide having a water content of 35 to 45%, provided as a solid or in liquefied form, by intensively kneading and mixing hydrated sodium sulfide at an elevated temperature and pressure to thereby liquify said hydrated sodium sulfide and obtain the anhydrous sodium sulfide.

5 Claims, 1 Drawing Sheet

METHOD FOR THE PREPARATION OF ANHYDROUS SODIUM SULFIDE

The present application claims priority benefits of U.S. Provisional Pat. Appln. No. 60/192,576, filed Mar. 28, 2000, which is incorporated by reference herein.

INTRODUCTION AND BACKGROUND

The present invention relates to a method of preparing anhydrous sodium sulfide by drying hydrated sodium sulfide.

One can find a hydrated sodium sulfide with an $Na_2S$ fraction of, in particular, 60 to 62%, as a product available on the market. According to stoichiometric calculation, this corresponds approximately to $Na_2S.3H_2O$. By introducing hydrogen sulfide into concentrated sodium hydroxide, a sodium sulfide hydrate melt, with a content of about 60% to 62% $Na_2S$, is formed at temperatures above 100° C. This is placed on a cooling conveyor, on which it solidifies (T<90° C.). After comminution, one generally obtains a scaly product, which is commonly available on the market.

From the state of the art, methods for the preparation of anhydrous sodium sulfide from $Na_2S.9H_2O$, $Na_2S.6H_2O$ or $Na_2S.5H_2O$ are already known. In accordance with EP-B-0345 136, which is incorporated herein by reference, the monohydrate is prepared in a first dehydration stage. A time of 2 hours or more is necessary for the removal of water. The remaining water contained in the monohydrate is then removed at a temperature of 90 to 200° C. and a reduced pressure of approximately 2.66 kPa (20 torr) to 66.5 kPa (500 torr). A similar two-stage method for the preparation of crystalline, anhydrous sodium sulfide is described in EP-B 0361 998, which is also incorporated by reference herein.

In the method described in EP 0924165, which is incorporated herein by reference, hydrated sodium sulfide, having a water content of 35 to 45 wt %, is heated under reduced pressure for the preparation of anhydrous sodium sulfide. The sodium sulfide is conveyed while it is being mixed by a device, the temperature of the supplied $Na_2S$ hydrate steadily rising from approximately 20° C., at the point where the solid is fed, to $\geq 180°$ C. at the exit for the solid. A reduced pressure of <20 torr is simultaneously maintained.

Disadvantages of these known methods include the fact that one must wait for the complete reaction, for example, to the monohydrate, in the first stage (EP-B-0345 136), before this compound can be supplied to the second temperature stage, or that the vaporization rate is very high (EP 0924165).

SUMMARY OF THE INVENTION

The object of the invention is therefore to provide a method by which an essentially anhydrous sodium sulfide is obtained, while avoiding the disadvantages inherent in existing processes.

This and other objects of the invention are obtained by a method for the preparation of anhydrous sodium sulfide with a content of at least 98 wt % $Na_2S$, preferably at least 99 wt. % $Na_2S$, by drying hydrous sodium sulfide, with a water content of 35 to 45%, wherein the hydrous sodium sulfide is used as a solid or in the liquified form, and is dried at a high temperature while it is being mixed and conveyed.

BRIEF DESCRIPTION OF THE DRAWINGS

The present invention will be further understood with reference to FIG. 1, which depicts a LIST Discotherm B 16 Conti from the LIST company, which can be used in the process according to the invention as a kneader-drier.

DETAILED DESCRIPTION OF THE INVENTION

Figure 1:
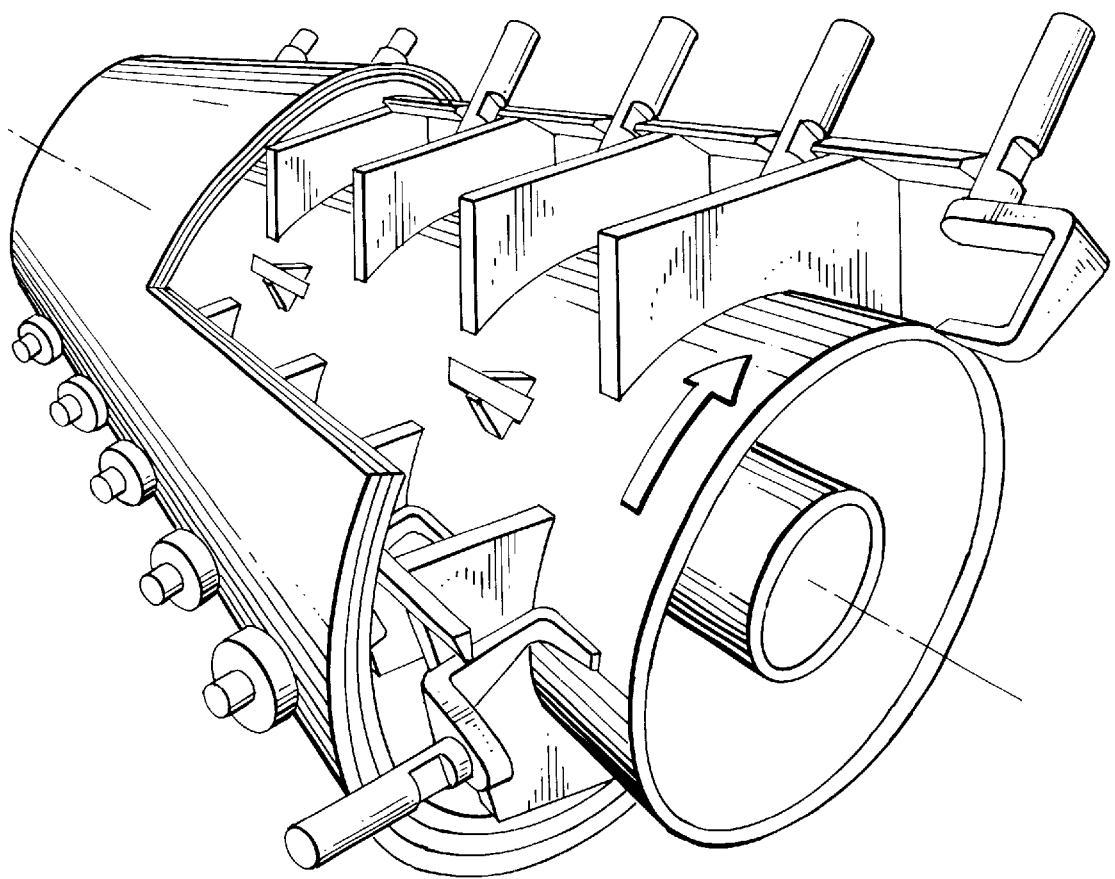

The drying of the hydrated sodium sulfide can be carried out in a kneader-drier. Kneader-driers have the advantage in that they produce an intensive kneading and mixing effect by the interplay of rotating and static kneading elements.

The drying temperature and pressure can be appropriately selected so as to effectively and efficiently produce the anhydrous sodium sulfide product. For example, suitable temperatures for the process can be in the range of 100°–200° C., preferably 120°–160° C., and suitable pressures for the process can be selected between 20 and 300 mbar, preferably between 40 and 100 mbar. Preferably, the drying will take place in an inert gas atmosphere, preferably nitrogen.

The method can be carried out discontinuously, as well as continuously.

The liquefaction of the hydrous sodium sulfide can take place by heating the material in a heatable container.

Preferably, the hydrous $Na_2S$ is used in the form of scales, small plates, or flakes with an edge length of 5 to 8 mm.

EXAMPLE

The hydrated $Na_2S$ product is heated in a heatable container to 100° C. and conducted to the kneader-drier. A LIST Discotherm B 16 Conti from the LIST company, depicted in FIG. 1, is used as the kneader-drier. The following table gives the conditions under which the method was carried out.

|  | Example 1 | Example 2 |
| --- | --- | --- |
| Throughput | 10–20 kg/h | 6.0 kg/h |
| Loading temp. | 110° C. | 110° C. |
| Heating temp. | 150° C. | 150° C. |
| Product temp. | 107–126° C. | 115–137° C. |
| Absolute pressure | approx. 75 mbar | approx. 53 mbar |
| RPM | 25 RPM | 25 RPM |
| Nitrogen overlay | 60 l/h | 60 l/h |

The dried product from the kneader-drier is collected in a discharge vessel. In this way, a product with an $Na_2S$ content of more than 99 wt % is obtained.

Further variations and modifications of the foregoing will be apparent to those skilled in the art and are intended to be encompassed by the claims which follow.

I claim:

1. A method of preparing anhydrous sodium sulfide having an $Na_2S$ content of at least 98 wt %, comprising drying hydrous sodium sulfide having a water content of 35 to 45%, provided as a solid or in liquified form, by intensively kneading and mixing hydrated sodium sulfide at an elevated temperature and pressure to thereby liquify said hydrated sodium sulfide and obtain the anhydrous sodium sulfide.

2. The method according to claim 1, wherein the drying is carried out in a kneader-drier.

3. The method according to claim 1, wherein the drying is carried out at a temperature from 100–200° C.

4. The method according to claim 1, wherein the drying is carried out at a pressure from 20 to 300 mbar.

5. The method according to claim 1, wherein the method is carried out continuously.

* * * * *